United States Patent [19]
Haupt

[11] Patent Number: 5,434,576
[45] Date of Patent: Jul. 18, 1995

[54] OPTIMIZED SUBARRAY AMPLITUDE TAPERS FOR ARRAY ANTENNAS

[75] Inventor: Randy L. Haupt, Monument, Colo.

[73] Assignee: The United States of America as represented by the Secretary of the Air Force, Washington, D.C.

[21] Appl. No.: 200,618

[22] Filed: Feb. 23, 1994

[51] Int. Cl.⁶ .............................................. G01S 3/16
[52] U.S. Cl. .................................. 342/378; 342/379
[58] Field of Search ................ 342/378, 379, 380, 383

[56] References Cited

U.S. PATENT DOCUMENTS

| | | | |
|---|---|---|---|
| 4,642,645 | 2/1987 | Haupt | 342/379 |
| 4,780,860 | 10/1988 | Sasakura et al. | 367/138 |
| 4,891,647 | 1/1990 | Auvray | 342/16 |
| 4,931,803 | 6/1990 | Shimko | 342/371 |
| 5,017,928 | 5/1991 | Haupt et al. | 342/379 |

OTHER PUBLICATIONS

Haupt, Randy L., "Reducing Grating Lobes Due to Subarray Amplitude Tapering", IEEE Trans. on Antennas and Propagation, vol. AP-33, No. 8, Aug. 1985, pp. 846-850.

Primary Examiner—Gregory C. Issing
Attorney, Agent, or Firm—Irwin P. Garfinkle; William G. Auton; Jacob N. Erlich

[57] ABSTRACT

A method for economically producing low sidelobe levels in the far field pattern of an array antenna is disclosed. The current fed to the subarrays is identically tapered to the elements of each subarray. Both the subarray current taper and the element current tapers are optimized to yield the lowest possible sidelobe levels.

1 Claim, 6 Drawing Sheets

OPTIMIZED SUBARRAY AMPLITUDE TAPERS FOR ARRAY ANTENNAS

STATEMENT OF GOVERNMENT INTEREST

The invention described herein may be manufactured and used ly or for the Government for governmental purposes without the payment of any royalty thereon.

The present invention relates generally to phased array radar and communication systems, and more specifically to a method of placing a low sidelobe amplitude taper on phased antenna arrays. Its purpose is to economically produce low sidelobes in the far field pattern of an array antenna in order to reject interference and jamming. The three salient features of this invention are that it (1) reduces interference entering the sidelobes, (2) reduces jamming entering the sidelobes, and (3) reduces costs of designing, building, testing, and maintaining a low sidelobe array antenna.

BACKGROUND OF THE INVENTION

Modern communications and radar systems need high performance antennas to cope with electromagnetic interference. These antennas are required to produce narrow beams and low sidelobes, and operate over a wide range of frequencies and scan angles. In addition, these antennas must reduce unwanted signals entering the main beam and/or sidelobes. The increasing problems with electromagnetic interference motivates systems engineers to build antenna arrays with these features.

An antenna array is a group of antenna elements whose output signals are combined to give one output. When the array gets very large, it is often constructed using subarrays, which are groups of antenna elements whose output signals are combined to give one output. In turn, the subarray outputs are added together to yield the array output.

Antenna arrays respond differently to signal depending on signal frequency, power and direction. At a given frequency, the antenna's spatial response is known an antenna pattern. There is generally one main lobe that significantly magnifies the signal. Other smaller lobes, called sidelobes, are spurious. The main lobe is pointed in the direction of signal propagation. Any signals entering the sidelobes are considered interference, noise or jamming. Thus, a lower sidelobe level relative to the main beam is very desirable.

Low sidelobe arrays weight the signals from the antenna elements and the subarray output before adding them together. There are many low sidelobe weighting systems described in the literature. For example see C. A. Balanis, Antenna Theory Analysis and Design, John Wiley and Sons, New York, 1982; and R. E. Collin, Antennas and Radio wave Propagation, McGraw-Hill Book Co., New York, 1985. All the arrays have the same characteristic, namely, the signal from each element receives a different weight. As an example, consider a 70 element array having a −32 dB Taylor low sidelobe amplitude taper. The product of the subarray amplitude weights, $b_m$, times the corresponding element amplitude weights, $a_{mn}$, yields the desired low sidelobe taper. While these amplitude tapers are desirable, they also require a very complex feed network. The complexity arises because all the $a_{mn}$ and $b_m$ are different. Thus, mass production is not possible, and the array is difficult and expensive to design, build and test.

To make the array antenna more modular is to make the value of $a_{mn}$ equal to 1 and then amplitude taper only the subarray outputs. Since the subarrays are identical, they can then be mass produced, and mass production of the subarrays provides a significant savings in design and manufacturing costs. However, applying the low sidelobe amplitude weight to only the subarray output $b_m$ produces rather large sidelobes in the far field pattern called grating lobes. These grating lobes are undesirable and defeat the purpose of low sidelobe amplitude taper.

SUMMARY OF THE INVENTION

This invention is for a method for economically producing low sidelobe levels in the far field pattern of an array antenna. The current fed to the subarrays is tapered as well as the current fed to the elements in the subarrays, such that the current taper to the elements of each subarray are identical. Both the subarray current taper and the element current tapers are optimized to yield the lowest possible sidelobe levels. Because the current taper in each subarray is made identical, the phased antenna array systems can be mass produced at reduced costs in the design, construction, and testing of the very expensive array antennas. A downhill simplex method is used to optimize the maximum relative sidelobe level.

BRIEF DESCRIPTION OF THE DRAWINGS

The features and advantages of the invention will become apparent from the following detailed description when taken in conjunction with the accompanying drawings wherein like elements are given like reference numerals throughout.

DETAILED DESCRIPTION OF THE PREFERRED EMBODIMENT

Figure 1:
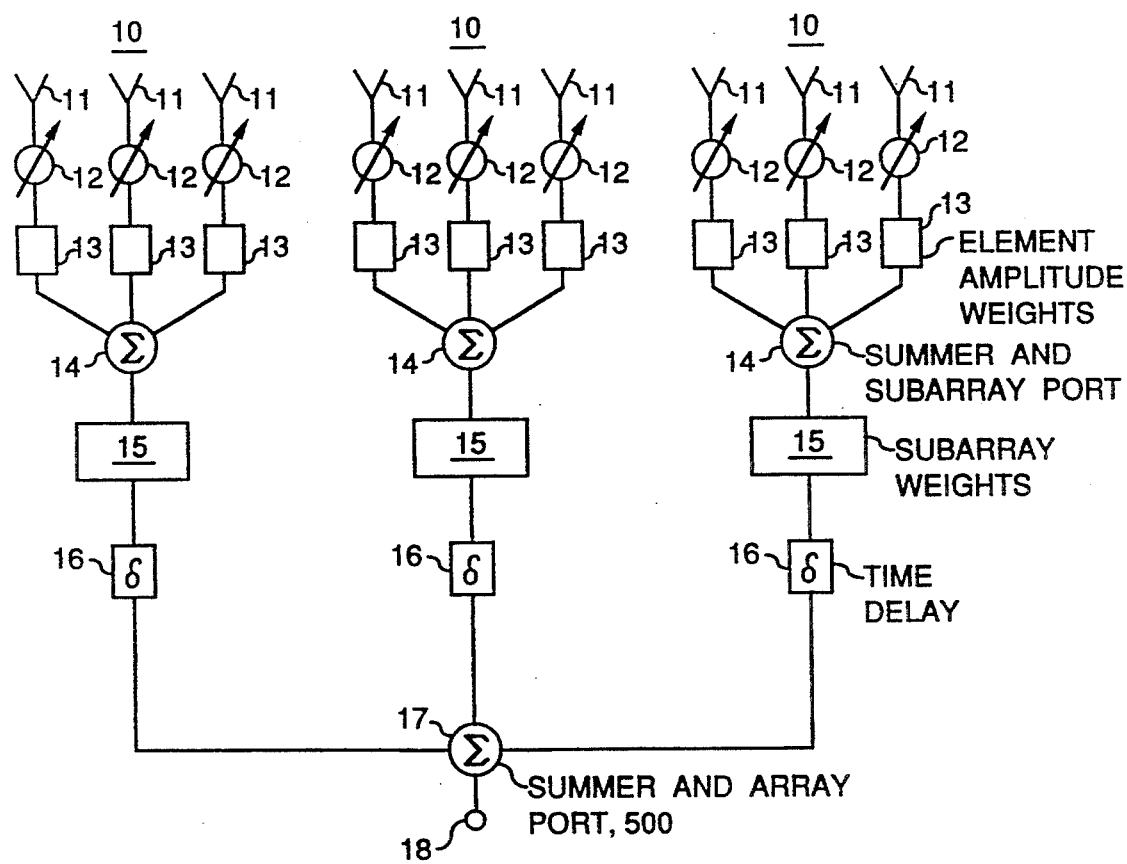
FIG. 1 is a block diagram of a prior art linear array divided into M continuous subarrays, having N elements per subarray.

The present invention provides a method of reducing grating lobes due to subarray amplitude tapering by having a pre-determined identical amplitude taper at the elements of each subarray. FIG. 1 is a block diagram of a prior art linear array divided into a number M of continuous subarrays 10, each subarray having a number N of identical antenna elements 11. While for the purpose of clarity and simplicity in describing the invention only 3 arrays and subarrays are illustrated, it should be understood that in a practical case, M was equal to 10, and N was equal to 7, for a total of 70 elements. Each antenna element 11 in each subarray is provided with a phase shifter 12 and element amplitude weights 13 to adjust the amplitude and phase of received signals at each antenna element. Each subarray port 14 receives and sums the signals produced by each element amplitude weight 13 in its subarray, to produce a subarray output signal, which is, in turn, weighted by a subarray weight 15, and modified by a time delay in time delay circuits 16.

The subarray output signals from each subarray time delay 16 are received and summed at the array port 17 to produce the array output signal at terminal 18. As in the prior art, the phase shifters 12 and time delay units 16 steer the main beam and amplitude weights 13 lower the sidelobes. Equation (1) gives the far field pattern for a linear array of isotropic elements with the main beam pointing at broadside. Mathematically, an array output is as follows:

$$F(u) = \sum_{m=1}^{M} b_m e^{jkd_s u} \sum_{n=1}^{N} a_{mn} e^{jkd_e u} \quad \text{(Eq. 1)}$$

where:

M = number of subarrays
N = number of elements per subarray
$b_m$ = amplitude weight at subarray m
$a_{mn}$ = amplitude weight at element n of subarray m
k = 2 Pi/wavelength
ds = spacing between subarrays
de = spacing between elements within a subarray
u = cos $\phi$
$\phi$ = observation direction A significant advantage can be gained by amplitude weighting the subarray outputs and amplitude weighting the elements, but making the element weight identical for each subarray. See my earlier publication "Reducing Grating Lobes Due To Subarray Amplitude Tapering", IEEE Trans. Ant. and Prop. August 85, pp. 846-850, and my earlier U.S. Pat. No. 4,642,645, which describe one way to find both the subarray amplitude weights and the element weights for such an array. The subarray weights are a low sidelobe amplitude taper. The element weights are bound by averaging the exact element weight at a given position in the subarray. Mathematically, this is represented as:

$$a_n = 1/M \sum_{m=1}^{M} a_{mn} \quad \text{Eq. 2}$$

Note that the element weight $a_n$ no longer depends upon a subarray, but does depend on the element position within the subarray. While my prior U.S. Pat. No. 4,642,645 was an improvement over previous systems, the weightings obtained produced a sidelobe level about 3 dB higher than desired. The present invention improves my prior patent by optimizing the $a_n$ and $b_n$ for a particular sidelobe level. The result is an improvement in the far field sidelobe level of several dB. Weights for the present array are derived using numerical optimization. The object is to find the lowest possible sidelobe level when the amplitude weighting for the elements in every subarray is identical. I use the downhill simplex method to optimize the maximum relative sidelobe, as follows:

$$F(u) = \sum_{m=1}^{M} b_m e^{jkd_s{}_m u} \sum_{n=1}^{N} a_n e^{jkd_e{}_n u} \quad \text{Eq. 3}$$

where:

M = number of subarrays
N = number of elements per subarray
$b_m$ = amplitude weight at subarray m
$a_n$ = amplitude weight at element n
k = 2 Pi/wavelength
ds = spacing between subarrays
de = spacing between elements within a subarray
u = cos $\phi$
$\phi$ = observation direction Equation 3 is called by the numerical optimization routine as a function of an and bn and returns the maximum relative sidelobe for the weights.

Weights for the antenna array of this invention are derived using numerical optimization. The object is to find the lowest possible sidelobe level when the amplitude weighting for the elements in every subarray is identical.

When the values for the subarray weights $b_m$ and element amplitude weights $a_{mn}$ are 1.0, then the array has a uniform amplitude taper and the first sidelobes in the far field pattern are about 13 db below the peak of the main beam.

Figure 2A:
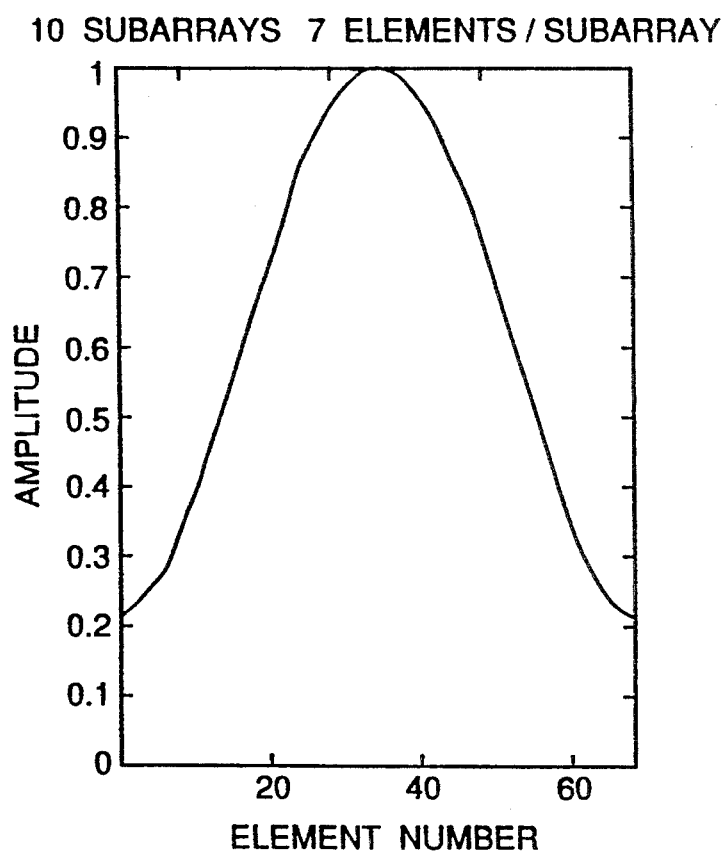
FIGS. 2–5 are curves showing the performance of the invention as compared with the prior art.
Figure 2B:
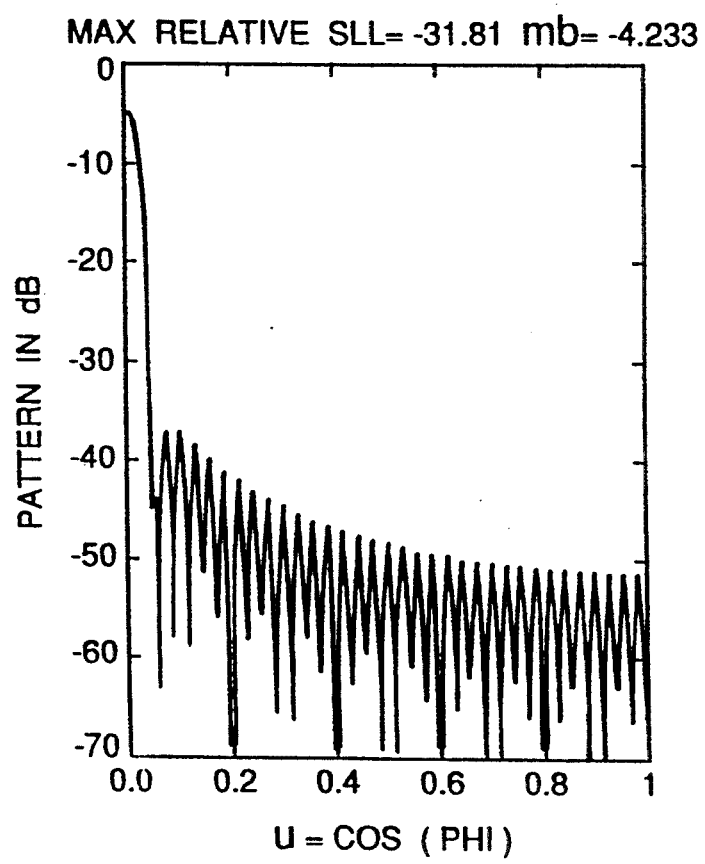

Consider a 70 element linear arrays with 10 subarrays of 7 elements per subarray. A 34 dB low sidelobe Taylor amplitude taper is shown in FIG. 2b. This taper is the product of the subarray amplitude weights times the element amplitude weights. Other than the symmetric elements, no two elements have the same amplitude weight. The resulting low sidelobe far field pattern appears in FIG. 2a.

Figure 3A:
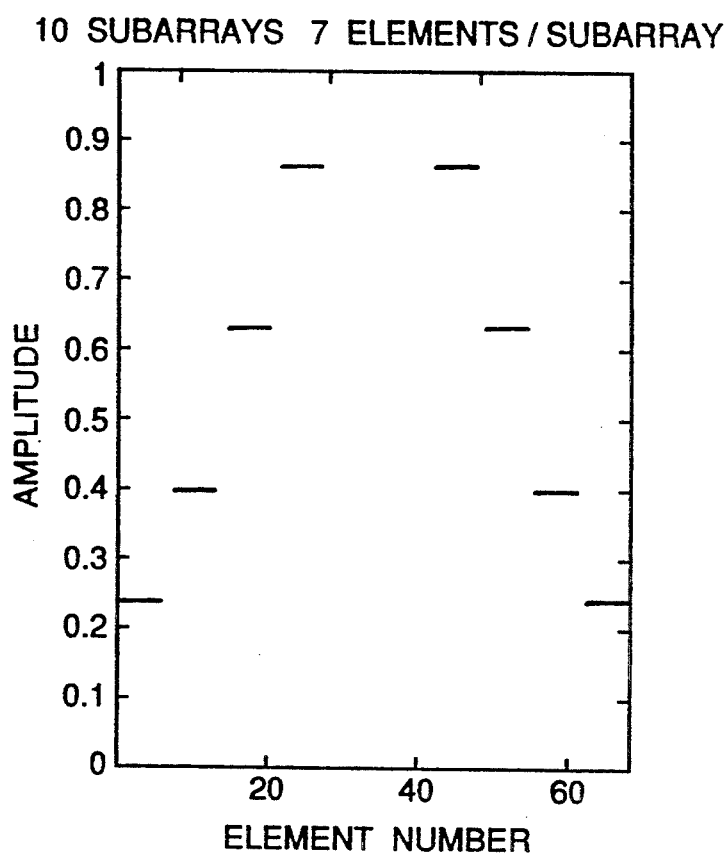
Figure 3B:
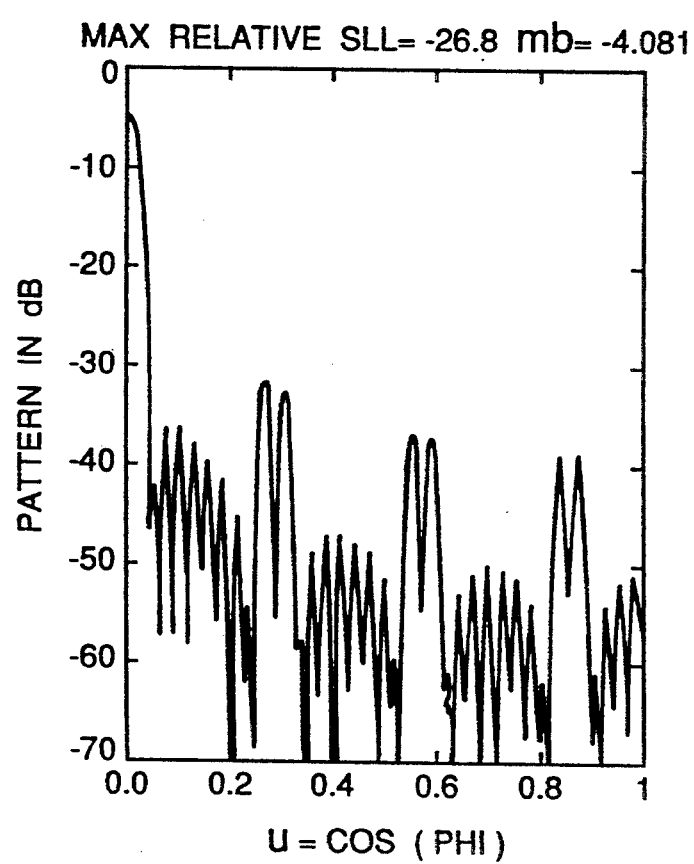

If we just amplitude taper the subarrays and not the elements within the subarrays, then in this case the elements are all equally weighted and cost reductions are possible. The problem with subarray amplitude weighting is that large grating lobes appear in the far field pattern. FIG. 3a is the far field pattern resulting from the 34 dB amplitude taper applied to the subarray weights and the element weights are equal to one (FIG. 3b). Note the large undesirable grating lobes in the far field pattern. These lobes defeat the purpose f the low sidelobe amplitude taper. The pattern in FIG. 3 has a peak sidelobe level that is 26.8 dB below the peak of the main beam.

Figure 4A:
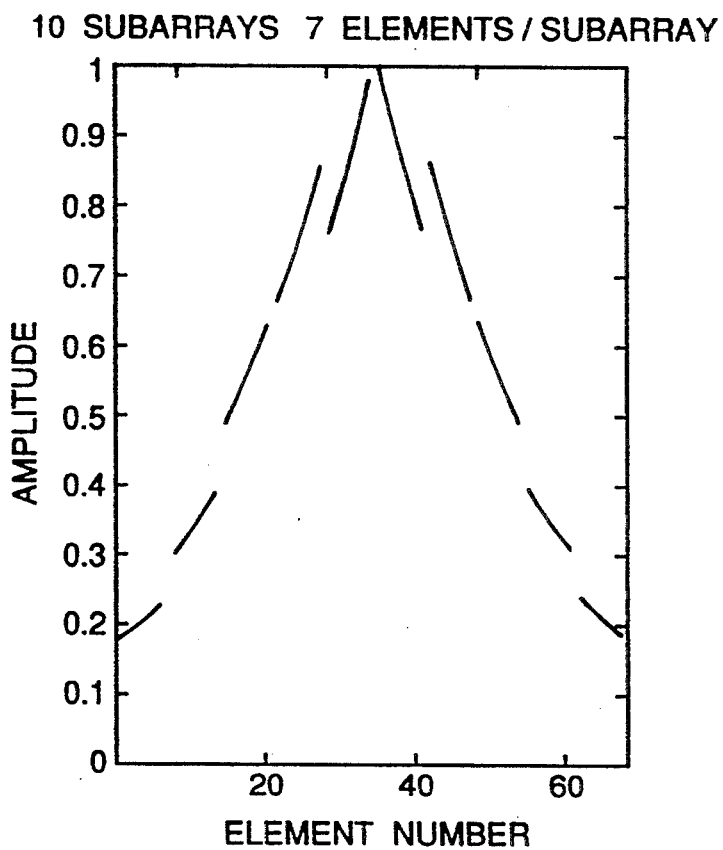
Figure 4B:
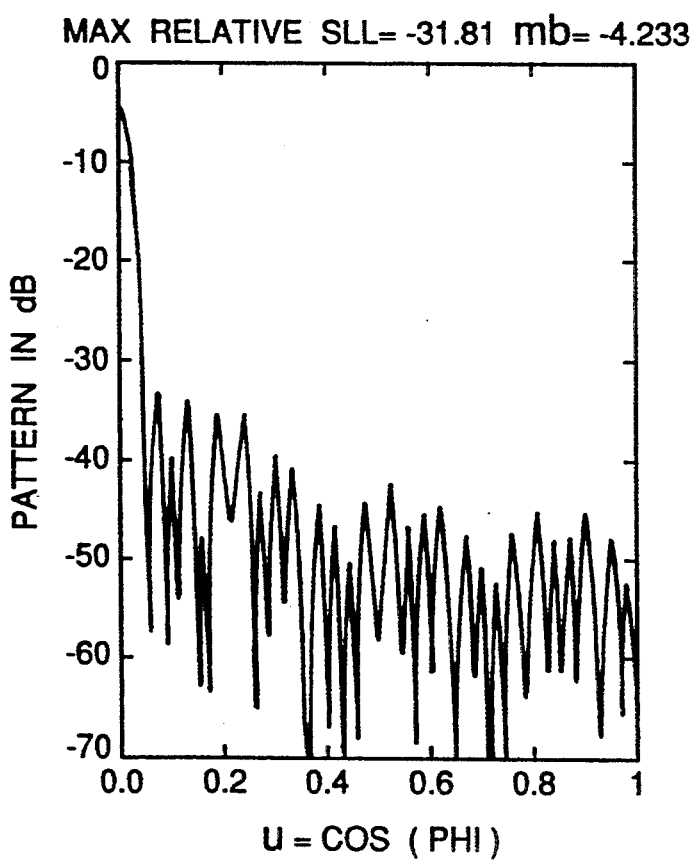

A simplification to the complex feed network is to use subarray amplitude weighting and apply identical element amplitude tapers within each subarray. This technique applies the low sidelobe amplitude taper (e.g. Taylor) to the subarray weights and finds the element amplitude weights by averaging the amplitude weights of the exact element amplitude weights. This technique works well for modest sidelobe levels and when there are more elements per subarray than number of subarrays. FIG. 4 shows the results of amplitude tapering the subarray feed and having an identical taper on all the subarrays. The peak sidelobe in this case is 29 dB below the peak of the main beam or is 2.2 dB lower than the subarray amplitude taper case in FIG. 3.

This invention uses the same concept of subarray amplitude tapering and placing identical element amplitude tapers in each subarray. The difference is in the way the subarray and element amplitude weights are derived and the quality of the sidelobe levels in the resulting far field pattern. This new method if far superior to the previous methods in producing low sidelobe levels.

My earlier U.S. Pat. No. 4,642,645 assumed the subarray amplitude weights followed a Taylor amplitude distribution and the element amplitude weights resulted from averaging the element amplitude weights of the exact taper. This invention assumes the subarray amplitude weights and the element amplitude weights are unknowns. All the amplitude weights are found through numerical optimization.

Figure 5A:
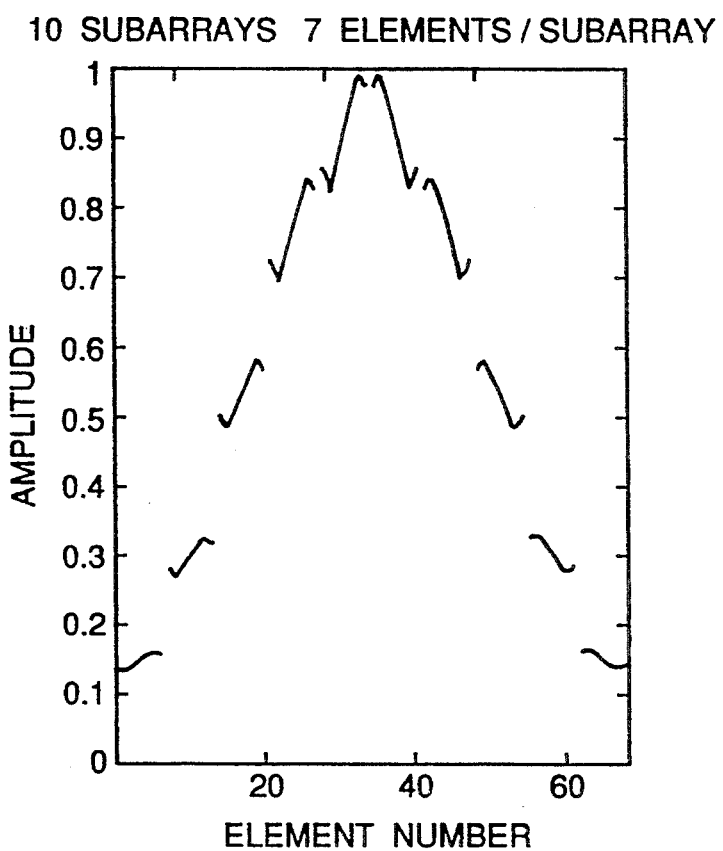
Figure 5B:
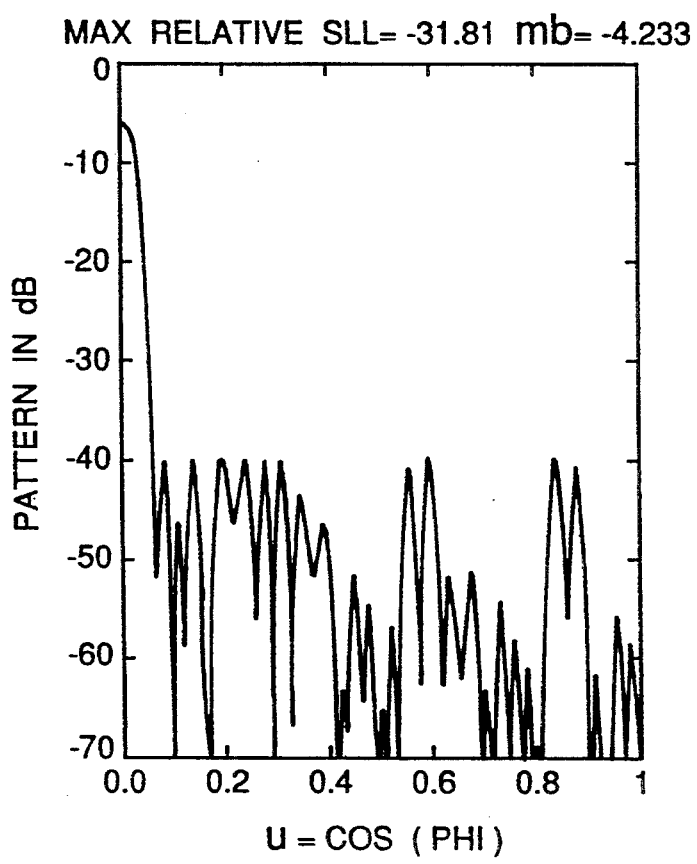

Using Equation 3, the object is to minimize F(u) in the sidelobe region by optimizing $b_m$ and $a_n$. In a practical case, after optimization the subarray amplitude weights were $b_1 = 0.1754$, $b_2 = 0.3622$, $b_3 = 0.6462$, $b_4=0.9369$, and $b_5=1.1040$ and the element weights were $a_1=0.5665$, $a_2=0.5432$, $a_3=0.5693$, $a_4=0.6078$, $a_5=0.6307$, $a_6=0.6579$, and $a_7=0.6466$. FIG. 5 shows the far field pattern and current distribution for an array optimized using this invention. In this case, the peak sidelobe level is 34 dB below the peak of the main beam. This is a full 5 dB below that obtained from the previous invention (FIG. 4a) and 7.2 dB below the subarray amplitude taper case (FIG. 3).

Figure 6:
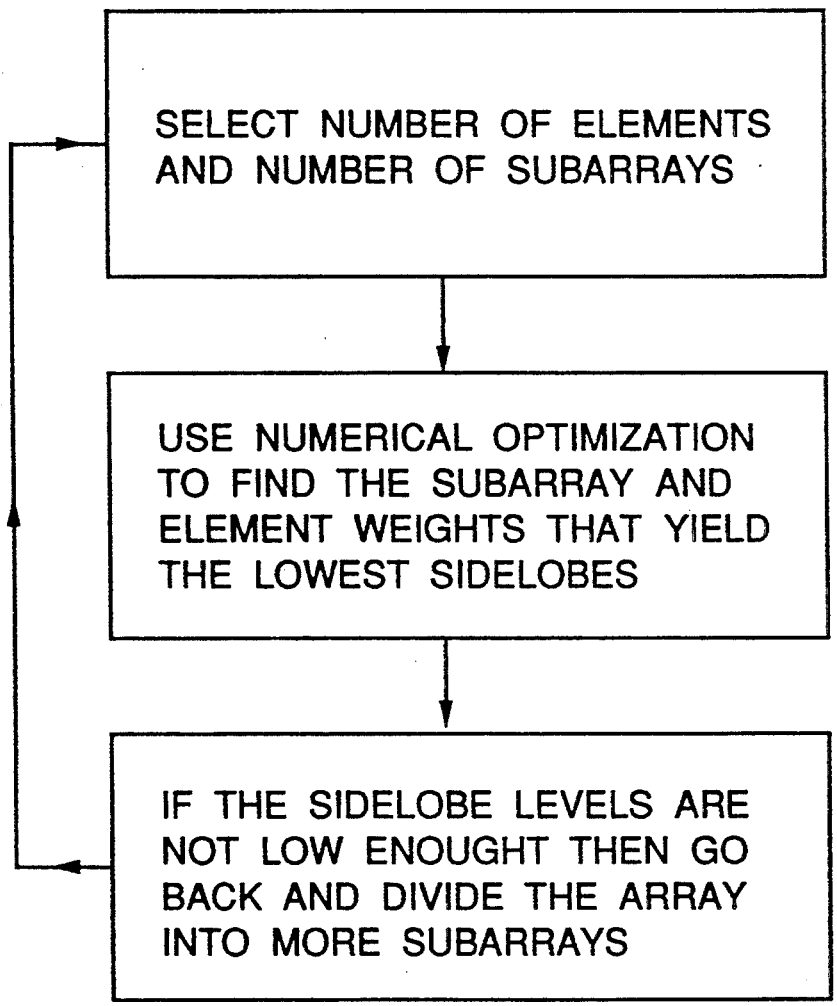
FIG. 6 is a flow chart illustrating the method of tapering provided herein.

The method of this invention is outlined in FIG. 6. First the total number of elements in the array and the number of subarrays is decided upon. Next, the subarray amplitude weights and the element amplitude weights are optimized. If the optimization process does not yield low enough sidelobe levels, then either the number of subarrays must be increased (decreasing the number of elements per subarray) or two subarrays of identical elements used.

The advantages of this invention are:
1. Produces low sidelobes in the far field pattern through amplitude tapering at the subarray level and having the same amplitude taper for the elements in each subarray.
2. Since all the elements in each subarray have the same amplitude taper, all the subarrays are identical. Identical subarrays greatly reduce the cost of designing, manufacturing and testing of subarrays.
3. This invention shows a method to optimally design the subarray and element tapers to produce the lowest possible sidelobe levels. The previous method produces low sidelobes but not the lowest possible sidelobes.
4. This invention applies to planar arrays as well as linear arrays.

Clearly, many modifications and variations of the present invention are possible in light of the above teachings and it is therefore understood, that within the inventive scope of the inventive concept, the invention may be practiced otherwise than specifically claimed.

What is claimed is:
1. In an antenna array having a plurality M of subarrays, and a plurality N of antenna elements, each antenna element being provided with a predetermined identical amplitude taper, each of said subarrays comprising a summer and subarray port for summing the combined amplitude tapered outputs of said elements, to produce a subarray output signal, which is, in turn, weighted by a subarray weight, the method of amplitude tapering comprising the steps of:
   a. selecting the number N of elements in the array and the number M of subarrays;
   b. next, using numerical optimization, selecting the subarray amplitude weights and the element amplitude weights that yield the lowest sidelobes in accordance with the equation:

$$F(u) = \sum_{m=1}^{M} b_m e^{jkd_s u} \sum_{n=1}^{N} a_n e^{jkd_e u} \quad \text{(Eq. 1)}$$

where:
M = number of subarrays
N = number of elements per subarray
$b_m$ = amplitude weight at subarray m
$a_n$ = amplitude weight at element n
k = 2 Pi/wavelength
ds = spacing between subarrays
de = spacing between elements within a subarray
u = cos $\phi$
$\phi$ = observation direction
   c. if the selection of the subarray and element amplitude weights does not yield sufficiently low sidelobe levels, then increase the number of subarrays by decreasing the number of elements per subarray; and
   d. repeating steps a, b and c until sufficiently low sidelobe levels are obtained.

* * * * *